United States Patent
Jeong et al.

(10) Patent No.: US 9,959,598 B2
(45) Date of Patent: May 1, 2018

(54) METHOD OF PROCESSING IMAGE AND ELECTRONIC DEVICE THEREOF

(71) Applicant: SAMSUNG ELECTRONICS CO., LTD., Suwon-si (KR)

(72) Inventors: Wook-Hyun Jeong, Suwon-si (KR); Jeong-Hyeon Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 267 days.

(21) Appl. No.: 14/842,746

(22) Filed: Sep. 1, 2015

(65) Prior Publication Data
US 2016/0063678 A1    Mar. 3, 2016

(30) Foreign Application Priority Data
Sep. 2, 2014    (KR) .................. 10-2014-0116101

(51) Int. Cl.
*G06T 5/00*    (2006.01)
*G06T 3/40*    (2006.01)
*G06T 11/00*   (2006.01)

(52) U.S. Cl.
CPC ............ *G06T 3/4092* (2013.01); *G06T 11/00* (2013.01); *G06T 2200/16* (2013.01)

(58) Field of Classification Search
None
See application file for complete search history.

(56) References Cited

U.S. PATENT DOCUMENTS

| | | | | |
|---|---|---|---|---|
| 6,020,923 | A * | 2/2000 | Hosaka | H04N 7/122 348/448 |
| 6,233,279 | B1 * | 5/2001 | Boon | G06T 9/20 375/240.08 |
| 6,502,107 | B1 * | 12/2002 | Nishida | G06F 17/3028 |
| 2002/0054711 | A1 * | 5/2002 | Hwang | G06T 9/00 382/240 |
| 2008/0180520 | A1 * | 7/2008 | Chang | H04N 5/77 348/36 |
| 2010/0053694 | A1 * | 3/2010 | Tsuchida | H04N 1/40 358/447 |
| 2010/0128928 | A1 * | 5/2010 | Ishiwatari | G06T 3/4053 382/103 |
| 2011/0010629 | A1 * | 1/2011 | Castro | G06F 3/1462 715/732 |
| 2011/0075734 | A1 * | 3/2011 | Sakazume | H04N 19/70 375/240.12 |
| 2011/0217954 | A1 * | 9/2011 | Lee | G06Q 10/107 455/412.1 |

(Continued)

FOREIGN PATENT DOCUMENTS

| | | |
|---|---|---|
| JP | 2004140654 | 5/2004 |
| JP | 2004179940 | 6/2004 |

*Primary Examiner* — David H Chu
(74) *Attorney, Agent, or Firm* — McAndrews, Held & Malloy, Ltd.

(57) ABSTRACT

Disclosed is an operation method of an electronic device. The operation method may include: acquiring a shared image from an image resource file; acquiring an auxiliary image by using a difference between the image resource file and the shared image; and generating a particular image based on the shared image and the auxiliary image. An operation method of an electronic device is not limited to the above method, and other embodiments are possible within the same or similar scope as the present disclosure.

20 Claims, 12 Drawing Sheets

(56) References Cited

U.S. PATENT DOCUMENTS

| | | | |
|---|---|---|---|
| 2013/0058572 A1* | 3/2013 | Kao | G06T 3/4007 |
| | | | 382/167 |
| 2014/0072239 A1 | 3/2014 | Alakuijala | |
| 2014/0143271 A1* | 5/2014 | Klotzer | G06F 17/3048 |
| | | | 707/769 |
| 2014/0307971 A1* | 10/2014 | Hanzawa | G06T 3/4053 |
| | | | 382/195 |

* cited by examiner

SHARED IMAGE(300)

RESOLUTION ENLARGED IMAGE(810)                AUXILIARY IMAGE(820)

PARTICULAR IMAGE(830)

METHOD OF PROCESSING IMAGE AND ELECTRONIC DEVICE THEREOF

CROSS-REFERENCE TO RELATED APPLICATION

This application claims priority under 35 U.S.C. § 119(a) to Korean Application Serial No. 10-2014-0116101, which was filed in the Korean Intellectual Property Office on Sep. 2, 2014, the entire content of which is hereby incorporated by reference.

TECHNICAL FIELD

The present disclosure relates to a method of processing an image in an electronic device and an electronic device for the same.

BACKGROUND

Recently, with the development of digital technologies, various electronic devices including mobile communication terminals, Personal Digital Assistants (PDAs), electronic organizers, smart phones, tablet Personal Computers (PCs), and the like, which can perform communication and personal information processing while being carried, have come to market. Prices of the electronic devices vary, and capabilities of the devices also vary according to price. The electronic device may have various resolutions based on its capabilities Meanwhile, a content provider (a content-providing device or a content-providing server) may provide an image file, which can be applied to a background image of the electronic device, a home screen image, a lock screen, or an icon of the home screen image, or an image installation file including a plurality of successive images to give an animation effect. However, as described above, the electronic devices have different resolutions, so the content provider should prepare various image files suitable for the respective resolutions of the electronic devices.

For example, the content provider may generate installation files, which simulate a user's mood such as a theme installation file mainly based on an image file, divide the files according to various categories, and provide the files. The user may access a server of the content provider by using the electronic device, download a desired installation file, and apply the downloaded installation file to a background image of the electronic device.

The content provider may provide one image file in various resolutions. That is, when one image file includes an image resource supporting all resolutions, the size of the image file becomes very large. In this case, the electronic device downloads not only the image resource at the resolution which can be applied to the electronic device, but also the image resource which is not suitable for the resolution of the electronic device. That is, the electronic device downloads unnecessary files and thus incurs the large data license fee.

In other cases, the content provider may configure image files divided according to each resolution, but in this case the content provider takes on the large costs of managing the image files. Alternatively, when the content provider provides an image file of one resolution, a high resolution electronic device may download an image file of inferior image quality.

SUMMARY

In accordance with an aspect of the present disclosure, an electronic device is provided. The electronic device includes: a communication interface configured to receive an image resource file from a content-providing server; a processor configured to read a shared image from the image resource file, identifying display information of the electronic device, determining an auxiliary image using a difference between the display information and the shared information, and generating a particular image based on the shared image and the auxiliary image and a display configured to display the generated particular image.

In accordance with another aspect of the present disclosure, an operation method of an electronic device is provided. The operation method includes: acquiring a shared image from an image resource file; acquiring an auxiliary image including using a difference between the image resource file and the shared image; and generating a particular image based on the shared image and the auxiliary image.

In accordance with another aspect of the present disclosure, an electronic device includes a computer-readable storage medium recording a program for executing a process. The process includes: acquiring a shared image from an image resource file; acquiring an auxiliary image including using a difference between the image resource file and the shared image; and generating a particular image based on the shared image and the auxiliary image.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
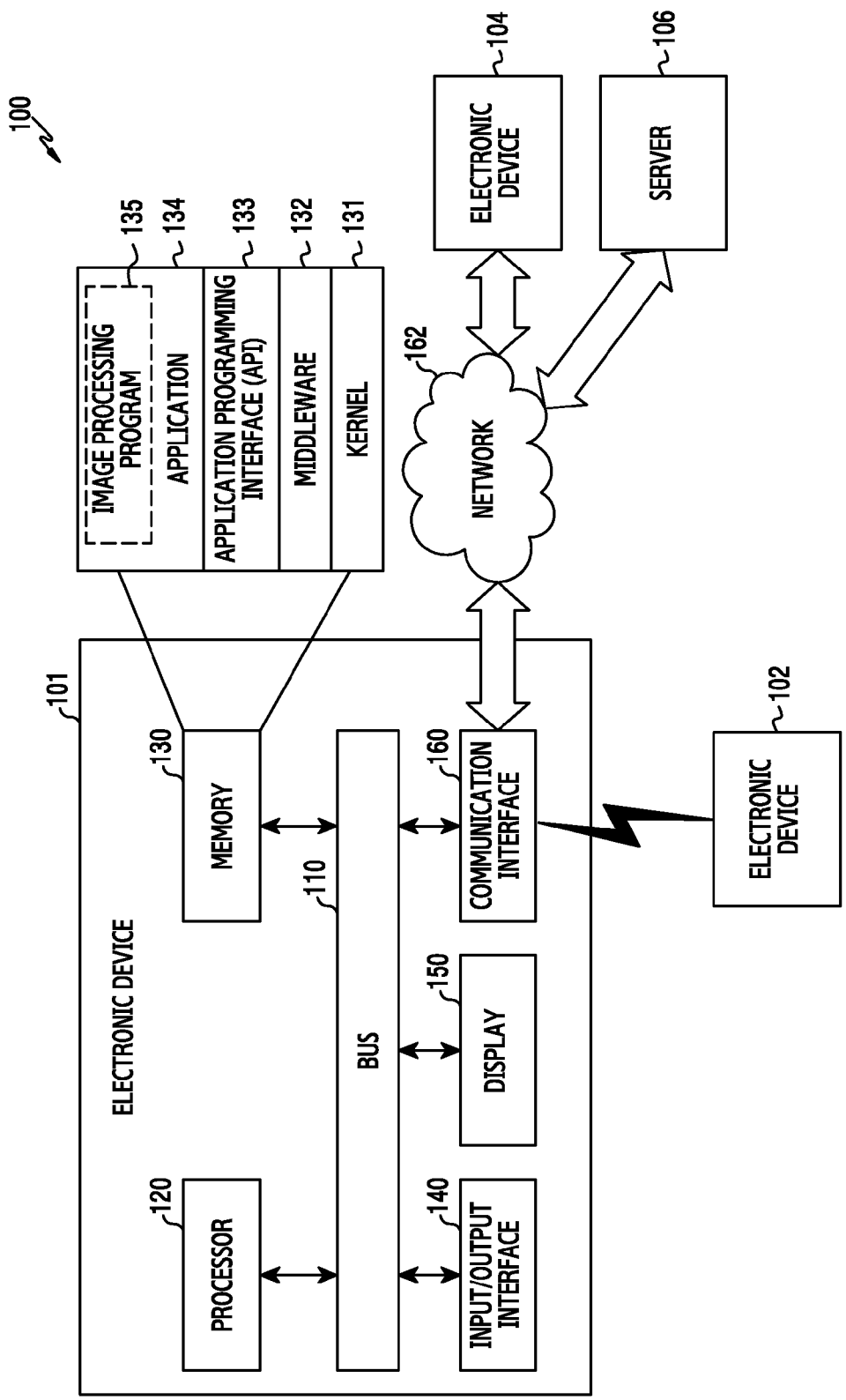
FIG. 1 illustrates a network environment including an electronic device according to various embodiments.

Hereinafter, the present disclosure will be described with reference to the accompanying drawings. The present disclosure may have various embodiments, and modifications and changes may be made therein. Therefore, the present invention will be described in detail with reference to particular embodiments shown in the accompanying drawings. However, it should be understood that there is no intent to limit the present disclosure to the particular forms, and the present disclosure should be construed to cover all modifications, equivalents, and/or alternatives falling within the spirit and scope of the present disclosure. In describing the drawings, similar elements are designated by similar reference numerals.

As used in the present disclosure, the expression "include" or "may include" refers to the existence of a corresponding function, operation, or constituent element, and does not limit one or more additional functions, operations, or constituent elements. Further, as used in the present disclosure, the term such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present disclosure, the expression "or", "at least one" includes any or all combinations of words enumerated together. For example, the expression "A or B", "at least one of A or/and B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present invention are merely for the purpose of describing particular embodiments and are not intended to limit the present disclosure. Singular forms are intended to include plural forms unless the context clearly indicates otherwise. Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to the present disclosure may be a device including a communication function. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smartwatch).

According to some embodiments, the electronic device may be a smart home appliance with a communication function. The smart home appliance as the electronic device, for example, may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic devices may include at least one of various medical devices (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) in a shop.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to the present disclosure may be a combination of one or more of the aforementioned various devices. Further, the electronic device according to the present disclosure may be a flexible device. Further, it will be apparent to those skilled in the art that the electronic device according to the present disclosure is not limited to the aforementioned devices.

Hereinafter, an electronic device according to various embodiments of the present disclosure will be discussed with reference to the accompanying drawings. The term "a user" as used in various embodiments may refer to any person who uses an electronic device or any other device (e.g., an artificial intelligence electronic device) using an electronic device.

FIG. 1 illustrates a network environment 100 including an electronic device 101 according to various embodiments of the present disclosure. Referring to FIG. 1, the electronic device 101 may include a bus 110, a processor 120, a memory 130, an input/output interface 140, a display 150, and a communication interface 160.

The bus 110 may be a circuit interconnecting the aforementioned components and transmitting communication (e.g., a control message) between the aforementioned components.

The processor 120, for example, may receive instructions from the aforementioned components (e.g., the memory 130, the input/output interface 140, the display 150, and the communication interface 160) other than the processor 120 through the bus 110, decode the received instructions, and perform operations or data processing according to the decoded instructions.

The processor 120 may perform predetermined functions of the electronic device 101. The processor 120 includes at least one Application Processor (AP) (not shown) and a Micro Controller Unit (MCU) (not shown). The AP and the MCU may be included in different Integrated Circuits (IC) packages, respectively. According to an embodiment, the AP and the MCU may be included in a single IC package.

The AP can execute an operating system (OS) or an application program to control a plurality of hardware and/or software elements connected to the AP and perform processing and calculation of various data including the multimedia data. The AP may be implemented by, for example, a System on Chip (SoC). According to an embodiment, the processor 210 may further include a Graphic Processing Unit (GPU) (not illustrated). The memory 130 may store instructions or data received from or generated by the processor 120 or other components (e.g., the input/output interface 140, the display 150, and the communication interface 160). The memory 130 may include programming modules, for example, a kernel 131, middleware 132, an application programming interface (API) 133, and applications 134. Each of the programming modules as described above may be formed by software, firmware, hardware, or a combination of two or more thereof.

The kernel 131 may control or manage system resources (e.g., the bus 110, the processor 120, and the memory 130) used to execute operations or functions implemented in the remaining other programming modules, for example, the middleware 132, the API 133, and the applications 134. Further, the kernel 131 may provide an interface that allows the middleware 132, the API 133, or the applications 134 to access and control or manage individual components of the electronic device 101.

The middleware 132 may serve to mediate between the API 133 or the applications 134 and the kernel 131, that is, allow the API 133 or the applications 134 to communicate and exchange data with the kernel 131. Further, the middleware 132 may perform control (e.g., scheduling or load balancing) for task requests received from the applications 134 by using, for example, a method of assigning a priority for use of the system resource (e.g., the bus 110, the processor 120, or the memory 130) of the electronic device 101 to at least one of the applications 134.

The API 133 is an interface (not shown) for allowing the applications 134 to control functions provided by the kernel 131 and the middleware 132, and may include at least one interface or function (e.g., instruction) for, for example, file control, window control, image processing, or text control.

According to various embodiments, the applications 134 may include a Short Message Service (SMS)/Multimedia Message Service (MMS) application, an e-mail application, a calendar application, an alarm application, a health care application (e.g., an application for measuring the amount of exercise or blood glucose), and an environmental information application (e.g., an application for providing atmospheric pressure information, humidity information, temperature information, and the like). Additionally or alternatively, the applications 134 may include an application associated with information exchange between the electronic device 101 and an external electronic device (e.g., the electronic device 104). The application associated with information exchange, for example, may include a notification relay application for transferring specific information to the external electronic device or a device management application for managing the external electronic device.

For example, the notification relay application may include a function of transferring notification information, generated in another application of the electronic device 101 (e.g., the SMS/MMS application, the e-mail application, the health care application, or the environmental information application), to an external electronic device (e.g., the electronic device 104). Additionally or alternatively, the notification relay application, for example, may receive notification information from an external electronic device (e.g., the electronic device 104) and provide the received notification information to a user. The device management application, for example, may manage (e.g., install, remove, or update) a function for at least a part of an external electronic device (e.g., the electronic device 104) communicating with the electronic device 101 (e.g., a function of turning on/off an external electronic device itself (or some components thereof) or adjusting the brightness (or resolution) of a display), an application running on the external electronic device, or a service provided in the external electronic device (e.g., a calling or messaging service).

According to various embodiments, the applications 134 may include an application specified according to an attribute (e.g., type) of an external electronic device (e.g., the electronic device 104). For example, when the external electronic device is an MP3 player, the applications 134 may include an application associated with music playback. Similarly, when the external electronic device is a mobile medical device, the applications 134 may include an application associated with health care. According to an embodiment, the applications 134 may include at least one of an application assigned to the electronic device 101 and an application received from an external electronic device (e.g., server 106 or the electronic device 104).

The applications 134 may also include an image processing program 135. The image processing program 135 may acquire a shared image generated from the image resource through the communication interface 160, determine an auxiliary image generated from a difference between display information of the electronic device 101 and the shared image, and generate a particular image based on the shared image and the auxiliary image. According to an embodiment, the image processing program 135 may read the auxiliary image from the image resource, or request for the auxiliary image to a content-providing server (e.g., the server 106) and receive the auxiliary image from the content-providing server (e.g., the server 106). According to an embodiment, the image processing program 135 may transmit the display information to the content-providing server and receive an auxiliary image corresponding to the display information. According to an embodiment, the image processing program 135 may transmit identification information on the shared image and the display information and receive auxiliary images corresponding to the display information and the identification information.

According to an embodiment, the image processing program 135 may process a low resolution image including at least a part of the image resource file to be the shared image. According to an embodiment, the image processing program 135 may process the remaining images except for the shared image as an auxiliary image in a particular resolution. According to an embodiment, the image processing program 135 may generate the shared image from at least one of an image resource file and a second image resource file of a resolution different from that of the image resource file. According to an embodiment, the image processing program 135 may acquire a second auxiliary image generated from a difference between the second image resource file and the shared image and generate a second particular image based on the shared image and the second auxiliary image.

The input/output interface 140, for example, may transfer instructions or data, input from a user through an input/output device (e.g., a sensor, a keyboard, or a touch screen, not shown), to the processor 120, the memory 130, and the communication interface 160 through the bus 110. For example, the input/output interface 140 may provide the processor 120 with data corresponding to a user's touch input through a touch screen (not shown). Further, the input/output interface 140 may, for example, receive instructions or data from the processor 120, the memory 130, and the communication interface 160 through the bus 110 and output the received instructions or data through the input/output device (e.g., a speaker or a display). For example, the input/output interface 140 may output voice data processed by the processor 120 to a user through a speaker.

The display 150 may display various pieces of information (e.g., multimedia data or text data) to a user.

The communication interface 160 may establish communication between the electronic device 101 and an external electronic device (e.g., the electronic device 104 or the server 106). For example, the communication interface 160 may be connected to the network 162 through wireless or wired communication and thereby communicate with the external device. The wireless communication, for example, may include at least one of wireless fidelity (WiFi), Bluetooth (BT), near field communication (NFC), a global positioning system (GPS), and cellular communication (e.g., LTE, LTE-A, CDMA, CDMA, UMTS, WiBro, or GSM). The wired communication, for example, may include at least one of a universal serial bus (USB), a high definition multimedia interface (HDMI), recommended standard 232 (RS-232), and a plain old telephone service (POTS).

According to an embodiment, the network 162 may be a telecommunications network. The telecommunications network may include at least one of a computer network, the Internet, the Internet of things, and a telephone network. According to an embodiment, a protocol (e.g., a transport layer protocol, a data link layer protocol, or a physical layer protocol) for communication between the electronic device 101 and an external device may be supported by at least one of the applications 134, the application programming interface 133, the middleware 132, the kernel 131, and the communication interface 160.

Figure 2:
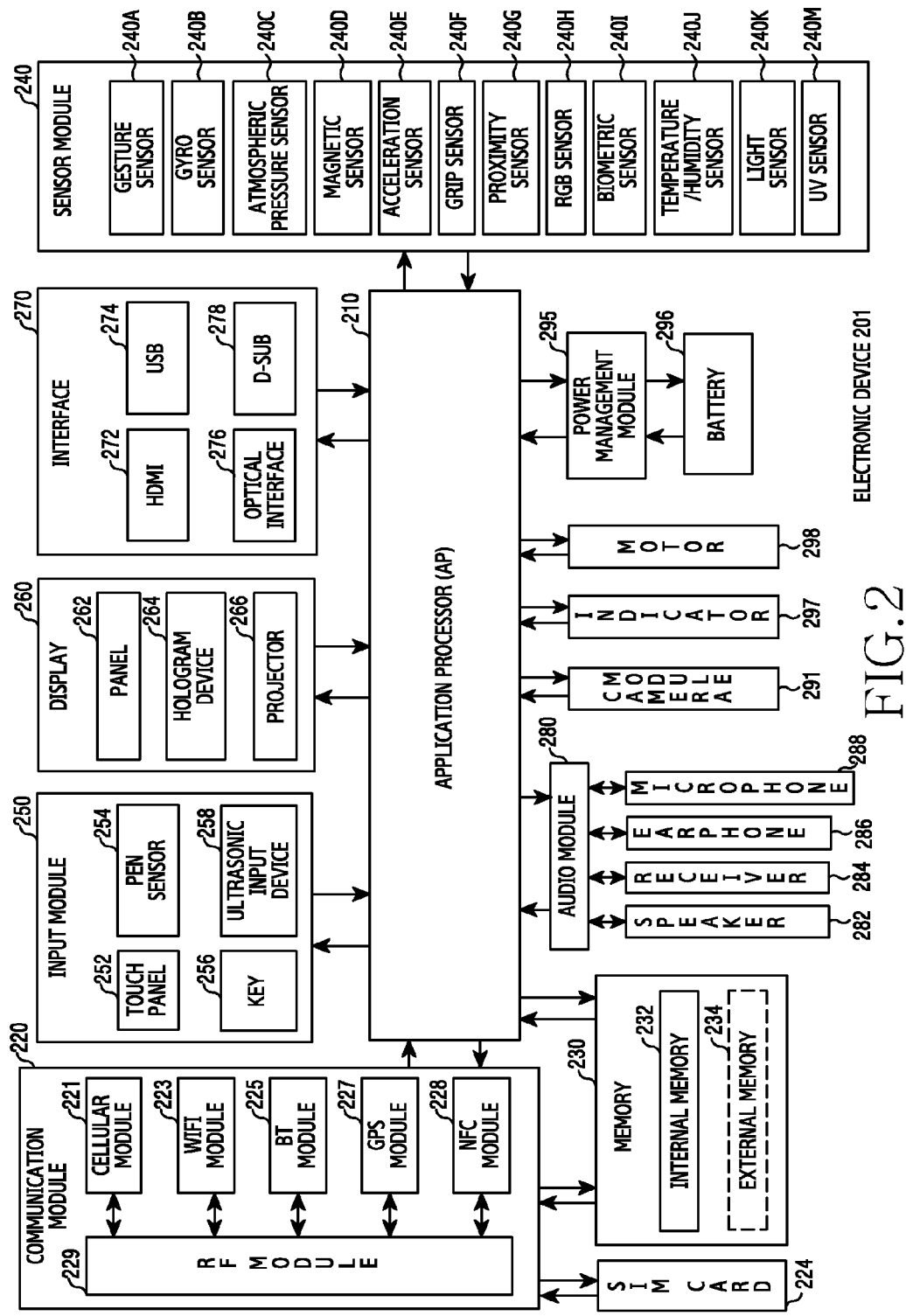
FIG. 2 is a block diagram of an electronic device according to various embodiments of the present disclosure.

FIG. 2 illustrates a block diagram of an electronic device according to various embodiments.

The electronic device 200, for example, may constitute all or a part of the electronic device 101 shown in FIG. 1. Referring to FIG. 2, the electronic device 200 may include at least one application processor (AP) 210, a communication module 220, one or more slots for at least one subscriber identity module (SIM) card 224, a memory 230, a sensor module 240, an input module 250, a display 260, an interface 270, an audio module 280, a camera module 291, a power management module 295, a battery 296, an indicator 297, and a motor 298.

The AP 210 may drive an operating system or an application program to control a plurality of hardware or software components connected to the AP 210, and may perform processing and operations of various data including multimedia data. The AP 210, for example, may be implemented as a system on chip (SoC). According to an embodiment, the AP 210 may further include a graphic processing unit (GPU) (not shown).

The communication module 220 (e.g., the communication interface 160) may perform data transmission/reception in communication with other electronic devices (e.g., the electronic device 104 and the server 106) connected to the electronic device 200 (e.g., the electronic device 101) through a network. According to an embodiment, the communication module 220 may include a cellular module 221, a WiFi module 223, a BT module 225, a GPS module 227, an NFC module 228, and a radio frequency (RF) module 229.

The cellular module 221 may provide a voice call, a video call, an SMS service, an Internet service, and the like through a communication network (e.g., LTE, LTE-A, CDMA, WCDMA, UMTS, WiBro, or GSM). Also, the cellular module 221 may identify and authenticate an electronic device in a communication network by using, for example, a subscriber identification module (e.g., the SIM card 224). According to an embodiment, the cellular module 221 may perform at least some of the functions that may be provided by the AP 210. For example, the cellular module 221 may perform at least a multimedia control function.

According to an embodiment, the cellular module 221 may include a communication processor (CP) (not shown). Further, the cellular module 221, for example, may be implemented as a SoC. Although the cellular module 221 (e.g., a CP), the memory 230, the power management module 295, and the like are shown as separate elements from the AP 210 in FIG. 2, the AP 210 may be implemented to include at least some (e.g., the cellular module 221) of the aforementioned elements according to an embodiment.

According to an embodiment, the AP 210 or the cellular module 221 (e.g., a CP) may load a command or data received from at least one of a non-volatile memory and other elements connected thereto into a volatile memory and process the loaded command or data. Further, the AP 210 or the cellular module 221 may store data received from or generated by at least one of other elements in a non-volatile memory.

Each of the WiFi module 223, the BT module 225, the GPS module 227, and the NFC module 228, for example, may include a processor for processing data transmitted or received through the corresponding module. Although the cellular module 221, the WiFi module 223, the BT module 225, the GPS module 227, and the NFC module 228 are shown as separate blocks in FIG. 2, at least some (e.g., two or more) of the cellular module 221, the WiFi module 223, the BT module 225, the GPS module 227, and the NFC module 228 may be included in one integrated chip (IC) or one IC package according to an embodiment. For example, at least some of processors corresponding to the cellular module 221, the WiFi module 223, the BT module 225, the GPS module 227, and the NFC module 228 respectively (e.g., a CP corresponding to the cellular module 221 and a WiFi processor corresponding to the WiFi module 223) may be implemented as one SoC.

The RF module 229 may perform data transmission/reception, for example, RF signal transmission/reception. Although not shown in the drawing, the RF module 229, for example, may include a transceiver (not shown), a power amp module (PAM) (not shown), a frequency filter (not shown), a low noise amplifier (LNA) (not shown), and the like. Also, the RF module 229 may further include a component for transmitting/receiving an electromagnetic wave over the air in wireless communication, such as a conductor or a conducting wire. Although FIG. 2 shows that the cellular module 221, the WiFi module 223, the BT module 225, the GPS module 227, and the NFC module 228 share one RF module 229, at least one of the cellular module 221, the WiFi module 223, the BT module 225, the GPS module 227, and the NFC module 228 may perform RF signal transmission/reception through a separate RF module (not shown) according to an embodiment.

The at least one SIM card 224 may be a card including a subscriber identification module (not shown), and may be inserted into a slot formed in a certain position of the electronic device. The at least one SIM card 224 may include unique identification information (e.g., integrated circuit card identifier (ICCID)) or subscriber information (e.g., international mobile subscriber identity (IMSI)).

The memory 230 (e.g., similar to the memory 130) may include an internal memory 232 or an external memory 234. The internal memory 232, for example, may include at least one of a volatile memory (e.g., a dynamic random access memory (DRAM), a static random access memory (SRAM), or a synchronous dynamic random access memory (SDRAM)) and a non-volatile memory (e.g., a one-time programmable read-only memory (OTPROM), a programmable read-only memory (PROM), an erasable and programmable read-only memory (EPROM), an electrically erasable and programmable read-only memory (EEPROM), a mask read-only memory, a flash read-only memory, a NOT AND ("NAND") flash memory, or an NOT OR ("NOR") flash memory).

According to an embodiment, the internal memory 232 may be a solid state drive (SSD). The external memory 234 may further include a flash drive, for example, a compact flash (CF), a secure digital (SD), a micro secure digital (Micro-SD), a mini secure digital (Mini-SD), an extreme digital (xD), or a memory stick. The external memory 234 may be functionally connected to the electronic device 200 through various interfaces. According to an embodiment, the electronic device 200 may further include a storage device (or storage medium) such as a hard drive (not shown).

The sensor module 240 may measure a physical quantity or detect an operation state of the electronic device 200 and convert the measured or detected information into an electronic signal. The sensor module 240, for example, may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color or RGB sensor 240H (e.g., a red, green and blue (RGB) sensor), a biometric sensor 240I, a temperature/humidity sensor 240J, a light sensor 240K, and a ultraviolet (UV) sensor 240M. Additionally or alternatively, the sensor module 240, for example, may include an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scanner (not shown), and/or a fingerprint sensor (not shown). The sensor module 240 may further include a control circuit for controlling one or more sensors included therein.

The input module 250 may include a touch panel 252, a (digital) pen sensor 254, a key 256, or an ultrasonic input device 258. The touch panel 252 that recognizes a touch input, for example, may include at least one of a capacitive touch panel, a resistive touch panel, an infrared touch panel, and an acoustic wave touch panel. Also, the touch panel 252 may further include a control circuit (not shown). When the touch panel 252 is a capacitive touch panel, it may recognize a physical contact or proximity. The touch panel 252 may also further include a tactile layer (not shown). In this case, the touch panel 252 may provide a tactile response to a user.

The (digital) pen sensor 254, for example, may be implemented using a means identical or similar to a means for receiving a touch input from a user or using a separate recognition sheet (not shown). The key 256, for example, may include a physical button (not shown), an optical key (not shown), or a keypad (not shown). The ultrasonic input device 258 is a unit that can identify data by generating an ultrasonic signal through an input tool (not shown) and detecting a sonic wave through a microphone (e.g., the microphone 288) in the electronic device 200, and is capable of wireless recognition. According to an embodiment, the electronic device 200 may also receive a user input from an external device (e.g., computer or server) connected thereto by using the communication module 220.

The display 260 (e.g., similar to the display 150) may include a panel 262, a hologram device 264, and a projector 266. The panel 262, for example, may be a liquid crystal display (LCD) or an active matrix-organic light emitting diode (AM-OLED). The panel 262, for example, may be implemented to be flexible, transparent, or wearable. The panel 262 may also be incorporated into one module together with the touch panel 252. The hologram device 264 may show a stereoscopic image in the air by using light interference. The projector 266 may display an image by projecting light onto a screen (not shown). The screen, for example, may be located inside or outside of the electronic device 200. According to an embodiment, the display 260 may further include a control circuit for controlling the panel 262, the hologram unit 264, or the projector 266.

The interface 270, for example, may include a high-definition multimedia interface (HDMI) 272, a universal serial bus (USB) 274, an optical interface 276, or a D-sub-miniature (D-sub) 278. The interface 270, for example, may be included in the communication interface 160 shown in FIG. 1. Additionally or alternatively, the interface 290, for example, may include a mobile high-definition link (MHL) interface, a secure digital (SD) card/multimedia card (MMC) interface, or an infrared data association (IrDA) interface.

The audio module 280 may provide bidirectional conversion between a sound and an electronic signal. At least some elements of the audio module 280, for example, may be included in the input/output interface 140 shown in FIG. 1. The audio module 280, for example, may process sound information input or output through a speaker 282, a receiver 284, earphones 286, or the microphone 288.

The camera module 291 is a device that can take both still and moving images, and according to an embodiment, may include one or more image sensors (e.g., a front sensor or a rear sensor, not shown), a lens (not shown), an image signal processor (ISP) (not shown), or a flash (e.g., a light-emitting diode (LED) or xenon lamp, not shown).

The power management module 295 may manage power of the electronic device 200. Although not shown, the power management module 295, for example, may include a power management integrated circuit (PMIC), a charger IC, or a battery or fuel gauge.

The PMIC, for example, may be mounted in an IC or an SoC semiconductor. Charging methods may be classified into wired charging and wireless charging. The charger IC may charge a battery, and may prevent an overvoltage or excess current from being induced or flowing from a charger. According to an embodiment, the charger IC may include a charger IC for at least one of the wired charging and the wireless charging. Examples of the wireless charging include magnetic resonance charging, magnetic induction charging, and electromagnetic charging, and an additional circuit such as a coil loop, a resonance circuit, and a rectifier may be added for the wireless charging.

A battery gauge (not shown), for example, may measure the residual capacity, charge in voltage, current, or temperature of the battery 296. The battery 296 may store or generate electricity, and may supply power to the electronic device 200 by using the stored or generated electricity. The battery 296, for example, may include a rechargeable battery or a solar battery.

The indicator 297 may display a specific status of the electronic device 200 or a part thereof (e.g., the AP 210), for example, a boot-up status, a message status, or a charging status. The motor 298 may convert an electrical signal into a mechanical vibration. Although not shown, the electronic device 200 may include a processing unit (e.g., GPU) for supporting a mobile TV. The processing unit for supporting a mobile TV may process media data pursuant to a certain standard, for example, digital multimedia broadcasting (DMB), digital video broadcasting (DVB), or media flow.

Each of the above described elements of the electronic device 200 according to the present disclosure may be formed by one or more components, and the names of the corresponding elements may vary according to the type of the electronic device 200. The electronic device 200 according to the present disclosure may include at least one of the above described elements, and may exclude some of the elements or further include other additional elements. Further, some of the elements of the electronic device 200 according to the present disclosure may be coupled to form a single entity while performing the same functions as those of the corresponding elements before the coupling.

An electronic device (e.g., the electronic device 200) may acquire various pieces of image data (or files) and use the acquired image data as images of various programs of the electronic device (e.g., the background image of the display 260, an icon displayed on the display 150 (of FIG. 1), and successive image resources to create an animation effect). An image provider (e.g., a content provider) may include various image resource files within an installation file (e.g., a theme installation file) and configure a server (e.g., the server 106 of FIG. 1) from which an electronic device (e.g., the electronic device 200) may download the installation file, and each server may include various installation files. The electronic device 200 may be configured to search for, download, and install such files, and read corresponding image resources and store the read image resources in a memory buffer for decoding or displaying them. This specification may describe a method for effectively supporting various resolutions in order to allow the electronic device 200 to use various image resources.

Figure 3:
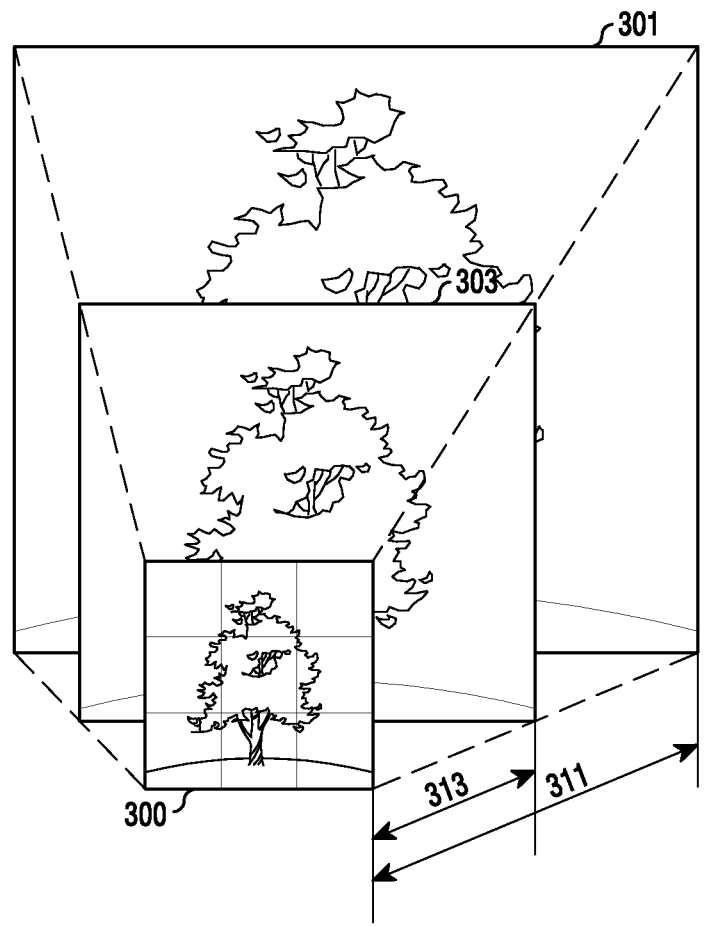
FIG. 3 illustrates an example of generating a shared image according to various embodiments.

FIG. 3 illustrates an example of generating a shared image according to various embodiments.

Referring to FIG. 3, a content-providing server (e.g., the server 106) may generate a shared image 300 from an original image (or an image resource file). The shared image 300 may be generated from the image resource file and may be at least one of a low resolution image having a predetermined size, an image having a particular size, and a particular resolution image. The shared image 300 may be used for generating an image (e.g., a particular image) identical or similar to the original image through a method of synthesizing, modifying, copying, and merging one or more images (e.g., auxiliary images). When the shared image 300 and the particular resolution image (e.g., an image 301 or 303) are required, the content-providing server may generate an image (e.g., an auxiliary image) corresponding to a difference between the shared image 300 and the particular resolution image (e.g., the image 301 or 303). The auxiliary image may be generated by changing (or modifying) a resolution of a particular resolution image resource file (e.g., the image 301). For example, the auxiliary image may be a remaining image, which is left after the shared image 300 is separated from the image resource file (e.g., the image 301) (e.g., the auxiliary image may be described as a difference 311 between the shared image 300 and the particular resolution image 301).

According to an embodiment, the shared image 300 may be an image of a color component and/or a brightness component of the original image (image resource file) or an image of a resolution and/or a size of the original image. According to an embodiment, the auxiliary image may be a low brightness or achromatic image. Hereinafter, although it is described that the electronic device 101 generates a particular image identical or similar to an image resource file by using a shared image and an auxiliary image generated from the image resource file, more precisely, the electronic device 101 may generate a particular image configured to be identical or similar to the image resource file.

Figure 4:
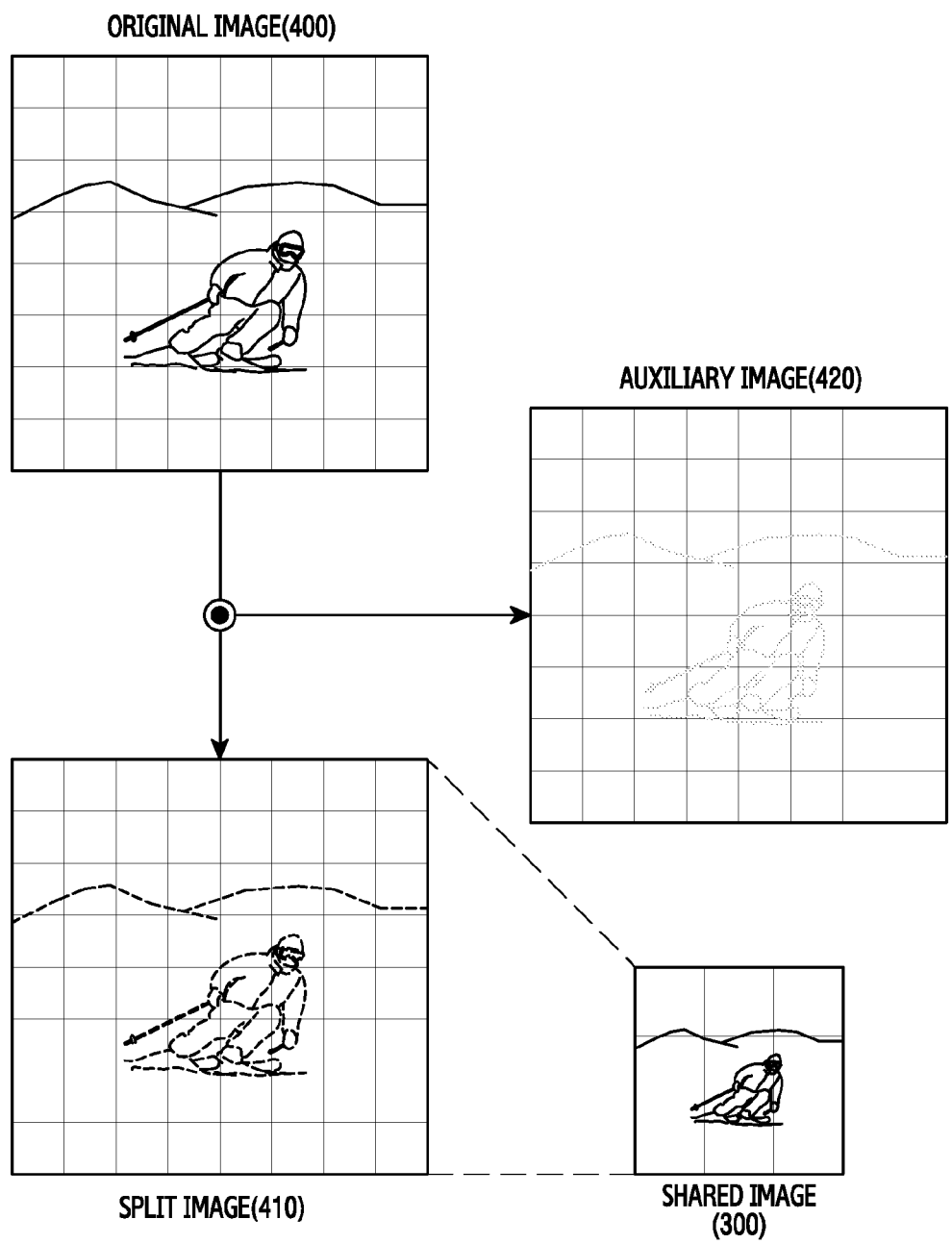
FIG. 4 illustrates an example of generating a shared image or an auxiliary image according to various embodiments.

FIG. 4 illustrates an example of generating a shared image or an auxiliary image according to various embodiments.

Referring to FIG. 4, a content-providing server (e.g., the server 106 of FIG. 1) may generate a shared image by using a particular resolution image. According to an embodiment, when generating the shared image, the content-providing server may perform an operation for changing (or modifying) the resolution. The operation for changing the resolution may use a downsizing scheme to change a resolution at a predetermined level of the particular resolution image to a lower resolution. The content-providing server may select at least some pixels (or pixel values) in a particular resolution image 400. The content-providing server may generate a split image 410 including at least some pixels selected in the particular resolution image 400. The content-providing server may re-arrange pixels of the generated split image 410. When re-arranging the pixels of the split image 410, the content-providing server may re-arrange the pixels selected in the particular resolution image 400 to generate a predetermined resolution image (e.g., the shared image 300). Further, when re-arranging the selected pixels to generate the predetermined resolution image, the content-providing server may delete at least some of the pixels selected in the particular resolution image 400 or at least some of the remaining pixels, which do not include the selected pixels, and generate predetermined pixels. The content-providing server may reduce the image resolution and generate the shared image 300, which has a predetermined size, by re-arranging the pixels of the generated split image 410.

The content-providing server may generate the split image 410 by selecting predetermined pixels in the particular image corresponding to an original image (e.g., the original image 400). According to an embodiment, the content-providing server may select pixels that have a predetermined color or brightness larger than or equal to a predetermined value in the original image 400 based on configuration information (display information of the electronic device 101 (of FIG. 1), for example, the resolution). Further, the content-providing server may select pixels that have pixel values (e.g., outline or boundary) corresponding to predetermined brightness or saturation (e.g., predetermined brightness and color) in the original image 400 through a comparison with neighboring pixels. The content-providing server may generate the split image 410 using the selected pixels. The electronic device 101 may generate the shared image 300 (of FIG. 3) by arranging at least some of the pixels included in the split image 410 in a predetermined scheme. When generating the shared image 300 based on the original image 400, the content-providing server may generate the shared image 300 corresponding to an entire area of the original image 400 or generate the shared image 300 corresponding to a partial area of the original image 400.

The electronic device 101 (of FIG. 1) may generate the particular resolution image 400 (e.g., the original image 400) by synthesizing the shared image 300 and at least one image. When generating the particular resolution image 400 based on the shared image 300, the electronic device 101 may require an image (e.g., an auxiliary image 420) including at least a part of the particular resolution image 400.

The auxiliary image 420 may be acquired through an operation for generating the shared image 300 based on the original image 400. According to an embodiment, when generating the auxiliary image 420, the content-providing server (e.g., the server 106 of FIG. 1) may generate an image including the remaining pixels of the original image 400 except for the pixels included in the split image 410 as the auxiliary image 420. The content-providing server may insert at least one piece of information related to the generation of the shared image 300, identification information of the shared image 300, identification information of the auxiliary image 420, and identification information of the original image 400 into at least one of the original image 400, the shared image 300, and the auxiliary image 420.

When the information related to the shared image is included in the image data, the content-providing server may insert the information related to the shared image into a header of the image data or into separate data. When inserting the information on the shared image 300, the content-providing server may insert information on an arrangement pattern and the positions of the pixels included in the split image in the resolution before the split image 410 is re-arranged. The information on the arrangement pattern of the pixels included in the split image 410 and the pixel positions may be determined based on the original image 400. According to an embodiment of the size of the image data, the size of the shared data 300 may be smaller than the size of the image resource file 400, and the size of the auxiliary image 420 may be smaller than the size of the shared image 300. Further, the size of the image generated by synthesizing the shared image 300 and the auxiliary image 420 may be identical or similar to the size of the image resource file 400. According to various embodiments, the electronic device 101 may receive a request for transmitting a first resolution image and a second resolution image based on the shared image included in another electronic device (e.g., the electronic device 102 of FIG. 1). The electronic device 101 (of FIG. 1) may transmit the first resolution image and the second resolution image, and may transmit a first auxiliary image generated between the first resolution image and the shared image and a second auxiliary image generated between the second resolution image and the shared image. The electronic device 101 may further reduce the data size used for data transmission/reception when corresponding auxiliary data is transmitted rather than transmitting a particular resolution image that was requested to be transmitted.

An operation for generating the shared image or the auxiliary image by using the particular resolution image (e.g., the original image) is not limited to the operation of the electronic device 101, but may be described as the operation of the server 106 for providing the shared image 300 or the auxiliary image 420.

Figure 5:
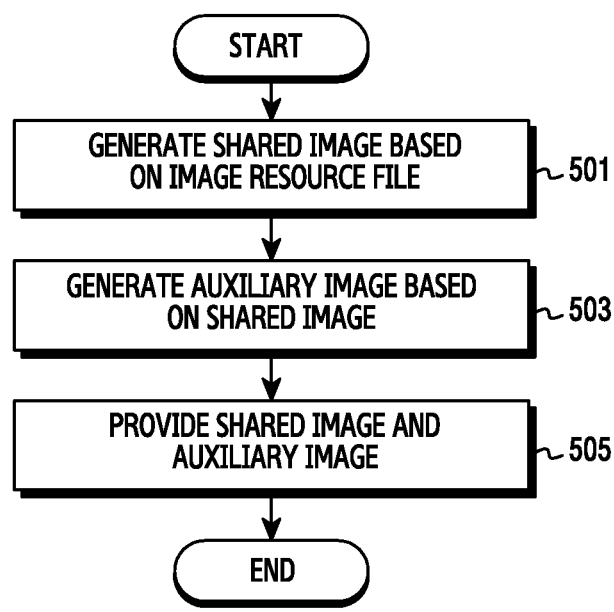
FIG. 5 is a flowchart illustrating an operation for generating a shared image or an auxiliary image based on an original image in an electronic device according to various embodiments.

FIG. 5 is a flowchart illustrating an operation for generating a shared image or an auxiliary image based on an original image according to various embodiments.

Referring to FIG. 5, in operation 501, the electronic device 101 (of FIG. 1) may generate a shared image based on an image resource file. According to an embodiment, the electronic device 101 may select at least one pixel from pixels included in the image resource file, and generate a new image (e.g., a split image) including pixel values of the selected pixels. The electronic device 101 may generate a shared image of a predetermined resolution by re-arranging the pixels, which are selected from the image resource file and included in the split image. With respect to the pixels, which are selected from the image resource file and included in the split image, information on positions or arrangement of the pixels may be stored in the shared image. When an image having a particular resolution identical or similar to that of the image resource file is generated based on the shared image, the stored image may be used as information for determining positions of the pixels included in the shared image in the generated image.

In operation 503, the electronic device 101 may generate an auxiliary image based on the shared image. The electronic device 101 may generate a particular image (e.g., the original image) by synthesizing the shared image and the auxiliary image. The electronic device 101 may generate the remaining images of the image resource file except for the shared image as the auxiliary image. For example, the electronic device 101 may generate a shared image (e.g., a split image) having a resolution identical or similar to that of the image resource file in the operation for generating the image resource file. The split image may be an image for at least some pixels in the image resource file. The electronic device 101 may determine an image of the remaining areas of the image resource file except for the split image (e.g., an image including the remaining pixels of the pixels of the image resource file except for the pixels of the split image) as the auxiliary image. In operation 505, the electronic device 101 may provide the generated shared image and/or auxiliary image. According to an embodiment, the electronic device 101 may provide the shared image to handle a request for various resolution images. For example, when the electronic device 101 receives a request for transmitting an image of a particular resolution for the shared image from another electronic device (e.g., the electronic device 102), which provides the shared image, the electronic device 101 may transmit auxiliary data generated between the image of the particular resolution and the shared image.

Figure 6:
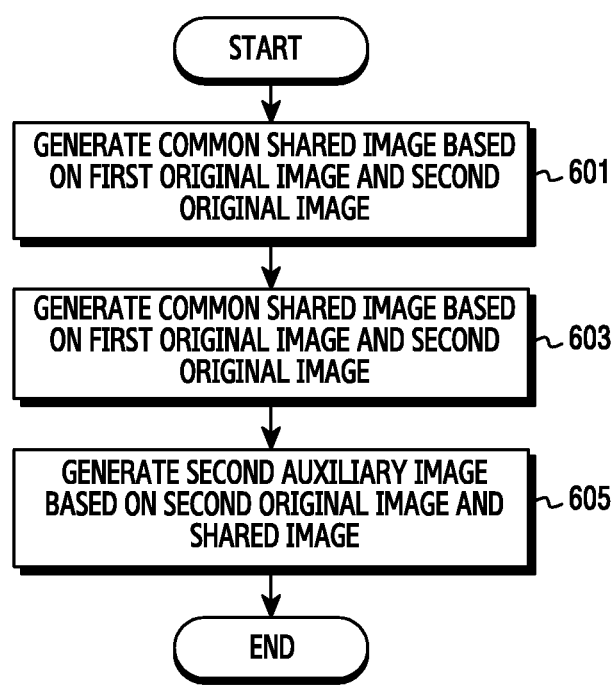
FIG. 6 is a flowchart illustrating an operation for generating a shared image or a plurality of auxiliary images in an electronic device according to various embodiments.

FIG. 6 is a flowchart illustrating an operation for generating a shared image or a plurality of auxiliary images according to various embodiments.

The electronic device 101 (of FIG. 1) may generate one shared image corresponding to the same image of various resolutions. The electronic device 101 may generate at least one auxiliary image with respect to shared data and an image of a particular resolution.

In operation 601, the electronic device 101 may generate a common shared image in a plurality of images of different particular resolutions. According to an embodiment, the electronic device 101 may generate a shared image including a common pixel between an image of a first particular resolution (e.g., a first original image) and an image of a second particular resolution (e.g., a second original image). The shared image may be a low resolution image, which is downsized from the first original image and the second original image.

In operation 603, the electronic device 101 may generate a first auxiliary image based on the first original image and the shared image. According to an embodiment, the electronic device 101 may generate a shared image of a common resolution by using two or more different particular resolution images (e.g., the image 301 or 303 of FIG. 3). According to an embodiment, the electronic device 101 may generate one shared image 300 based on two or more image source files of different resolutions and generate an auxiliary image corresponding to a difference between each of the image resource files and the shared image 300. For example, the electronic device 101 may generate the remaining images of the first original image except for the shared image as the first auxiliary image. For example, the electronic device 101 may configure an image including the remaining pixels except for pixels corresponding to the pixels included in the shared image among the pixels included in the first original image as the first auxiliary image.

In operation 605, the electronic device 101 may generate a second auxiliary image based on the second original image and the shared image. According to an embodiment, the electronic device 101 may generate the remaining images of the second original image except for the shared image as the second auxiliary image. For example, the electronic device 101 may configure an image including the remaining pixels except for pixels corresponding to the pixels included in the shared image among the pixels included in the second original image as the second auxiliary image. When performing operations 603 and 605 described above, the electronic device 101 may sequentially perform the operations according to a preset priority or may simultaneously perform the operations.

The electronic device 101 may end the embodiment of FIG. 6 after performing operation 605.

The electronic device 101 may transmit the generated shared data to another electronic device (e.g., the electronic device 102) and receive a request for transmitting the first original image or the second original image from the electronic device 102. The electronic device 101 may transmit an auxiliary image (e.g., the first auxiliary image) corresponding to the requested image of the particular resolution (e.g., the first original image). The electronic device 102 having received the auxiliary image may generate the image of the particular resolution (e.g., the first original image), which was requested to be transmitted from the electronic device 101 based on the shared image and the received auxiliary image (e.g., the first auxiliary image).

Figure 7:
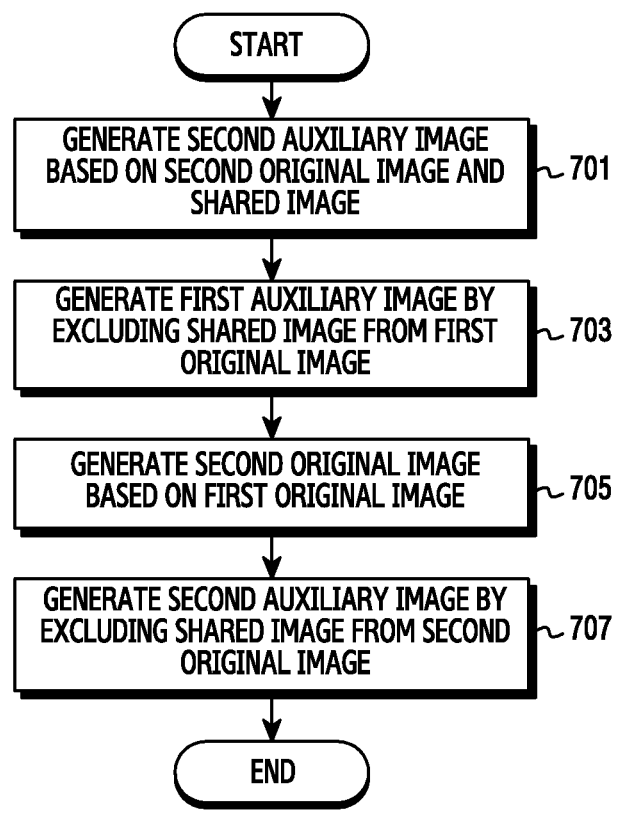
FIG. 7 is a flowchart illustrating an operation for generating a shared image or a plurality of auxiliary images in an electronic device according to various embodiments.

FIG. 7 is a flowchart illustrating an operation for generating a shared image or a plurality of auxiliary images by an electronic device according to various embodiments.

The electronic device 101 (of FIG. 1) may generate a common shared image based on different particular resolution images and generate an auxiliary image corresponding to the shared image and each of the particular resolutions.

In operation 701, the electronic device 101 may generate the shared image based on an image of a first particular resolution (e.g., a first original image). According to an embodiment, the electronic device 101 may select at least one pixel from pixels included in the first original image, and generate a new image (e.g., a split image) including pixel values of the selected pixels. The electronic device 101 may generate a shared image of a predetermined resolution by re-arranging the pixels, which are selected from the first particular resolution and included in the split image. Information on positions of the pixels, which are selected from the first particular resolution and included in the split image, in the first particular resolution or information on arrangement of the pixels may be stored in the shared image. When an image having a particular resolution identical or similar to the first particular resolution is generated based on the shared image, the stored image may be used as information for determining positions of the pixels included in the shared image in the generated image.

In operation 703, the electronic device 101 may generate a first auxiliary image based on the first original image. When generating the first original image by using the shared image, the electronic device 101 may synthesize the first original image by using at least one first auxiliary image. According to an embodiment of generating the first auxiliary image, the electronic device 101 may generate the remaining images of the first original image except for the shared image as the first auxiliary image. For example, the electronic device 101 may generate a shared image (e.g., a split image) of a resolution identical or similar to that of the first original image in the operation for generating the first original image. The split image may be an image for at least some pixels in the first original image. The electronic device 101 may determine an image of the remaining areas of the first original image except for the split image (e.g., an image including the remaining pixels except for the pixels of the split image in the pixels of the first original image) as the first auxiliary image. The electronic device 101 may synthesize the first original image based on the shared image and the first auxiliary image.

In operation 705, the electronic device 101 may generate an image of a second particular resolution (e.g., a second original image) based on the first original image. According to an embodiment, the electronic device 101 may acquire the second original image by performing a downsizing operation, which deteriorates the resolution and/or quality of the first original image. The electronic device 101 may determine pixels included in the first original image, which correspond to the pixels included in the shared image, and generate second original data in a state where the determined pixels are not excluded.

In operation 707, the electronic device 101 may generate a second auxiliary image based on the second original image. When generating the second original image by using the shared image, the electronic device 101 may synthesize the second original image by using at least one second auxiliary image. According to an embodiment of generating the second auxiliary image, the electronic device 101 may generate the remaining images of the second original image except for the shared image as the second auxiliary image. For example, the electronic device 101 may generate a shared image (e.g., a split image) of a resolution identical or similar to that of the second original image in the operation for generating the second original image. The split image may be an image for at least some pixels in the second original image. The electronic device 101 may determine an image of the remaining areas of the second original image except for the split image (e.g., an image including the remaining pixels except for the pixels of the split image in the pixels of the second original image) as the second auxiliary image. The electronic device 101 may synthesize the second original image based on the shared image and the second auxiliary image.

The electronic device 101 may end the embodiment of FIG. 7 after performing operation 707.

Figure 8:
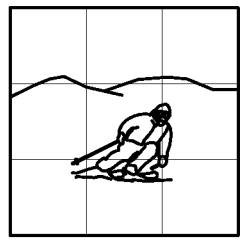
FIG. 8 illustrate the generation of a particular image in an electronic device according to various embodiments.
Figure 8:
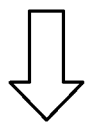
Figure 8:
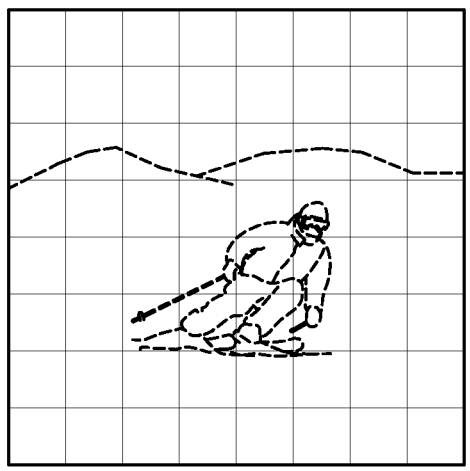
Figure 8:
Figure 8:
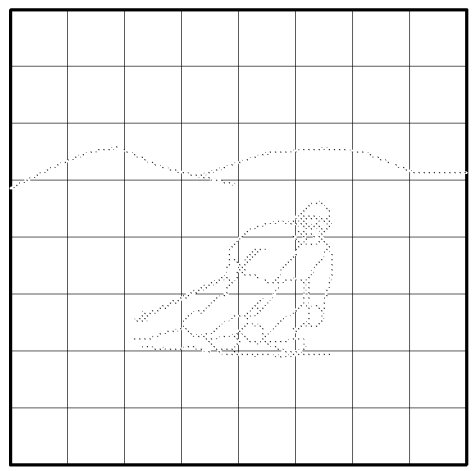
Figure 8:
Figure 8:
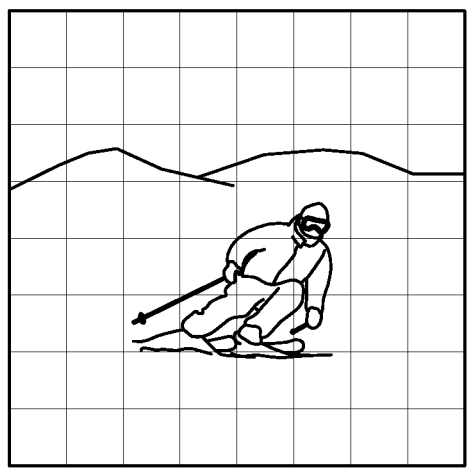

FIG. 8 illustrates the generation of a particular image in an electronic device according to various embodiments.

Referring to FIG. 8, the electronic device 101 (of FIG. 1) may generate an image 830 of a particular resolution based on the shared image 300 (of FIG. 3) and an auxiliary image 820. According to an embodiment, when an image of a high resolution (e.g., an image of a particular resolution) identical to that of the shared image is required, the electronic device 101 may determine an auxiliary image of a resolution identical or similar to that of the shared image and the particular resolution. The electronic device 101 may enlarge the shared image. For example, the electronic device 101 may enlarge the resolution of the shared image to an image of a particular resolution (e.g., a resolution enlarged image 810).

The electronic device 101 may arrange pixels included in the shared image in the resolution enlarged image 810 at the position corresponding to the image of the particular resolution based on configuration information. The electronic device 101 may generate a high resolution image of the requested particular resolution based on the resolution enlarged image and the auxiliary image 820. The electronic device 101 may generate an image 830 of a particular resolution through a copying, merging, modifying, or synthesizing scheme based on the resolution enlarged image 810 and the auxiliary image 820. The image 830 of the particular resolution generated by the electronic device 101 may be an image of quality identical or similar to that of the original image of the particular resolution requested based on the shared image.

Figure 9:
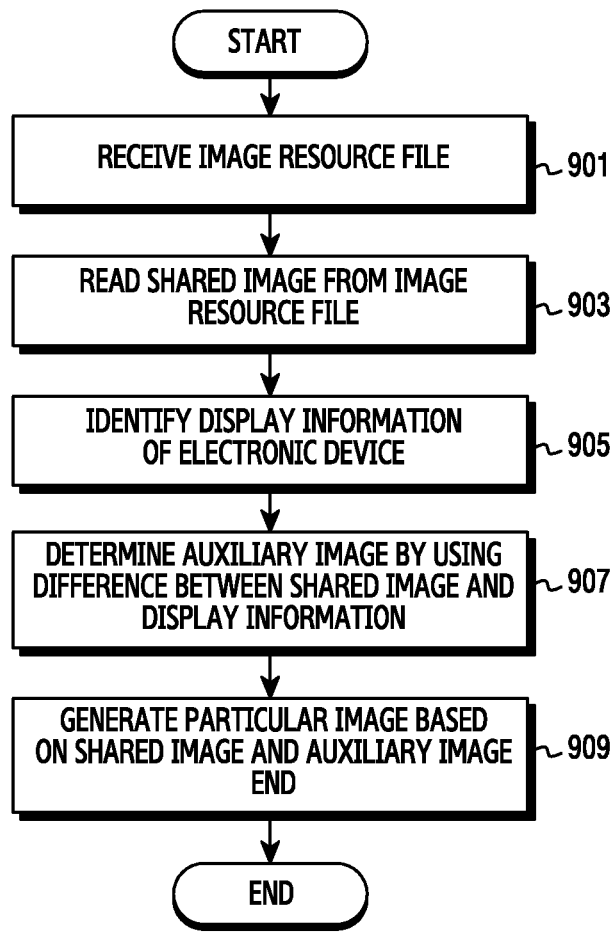
FIG. 9 is a flowchart illustrating an operation for generating a particular image in an electronic device according to various embodiments.

FIG. 9 is a flowchart illustrating a process of generating a particular image in an electronic device according to various embodiments.

Referring to FIG. 9, in operation 901, the processor 120 (of FIG. 1) may receive an image resource file from the content-providing server through the communication interface 160 (of FIG. 1). The image resource file may be an image file, which can be applied to a background image of the electronic device 101 (of FIG. 1), a home screen image, a lock screen, and an icon of the home screen image or an image installation file including a plurality of successive images for an animation effect. The image resource file may include only a shared image or include both the shared image and an auxiliary image. The image resource file may refer to the above described original image.

In operation 903, the processor 120 may read the shared image from the image resource file. The reading of the shared image may refer to extracting or reading the shared image from the image resource file.

In operation 905, the processor 120 may identify display information of the electronic device 101. The display information of the electronic device 101 may be a resolution or a pixel value of the display 150 (of FIG. 1). Alternatively, the display information may be a resolution or a pixel value set to the electronic device 101 by the user.

In operation 907, the processor 120 may determine an auxiliary image by using a difference between the shared image and the display information. The auxiliary image may be read by the processor 120 from the image resource file based on the difference between the shared image and the display information. Alternatively, the processor 120 may receive the auxiliary image from the content-providing server. To this end, the processor 120 may transmit identification information of the shared image and the display information to the content-providing server. The content-providing server may search for the auxiliary image corresponding to the identification information of the shared image and the display information and transmit the found auxiliary image to the electronic device 101.

In operation 909, the processor 120 may generate a particular image based on the shared image and the auxiliary image. The particular image may refer to an image made to be suitable for the display information of the electronic device 101. For example, the processor 120 may generate the particular image according to the resolution of the display 150.

When the particular image is generated, the display 150 may display the particular image. For example, when the image resource file is received to be set as a background image of the electronic device 101, the display 150 may display the particular image as the background image.

Figure 10A:
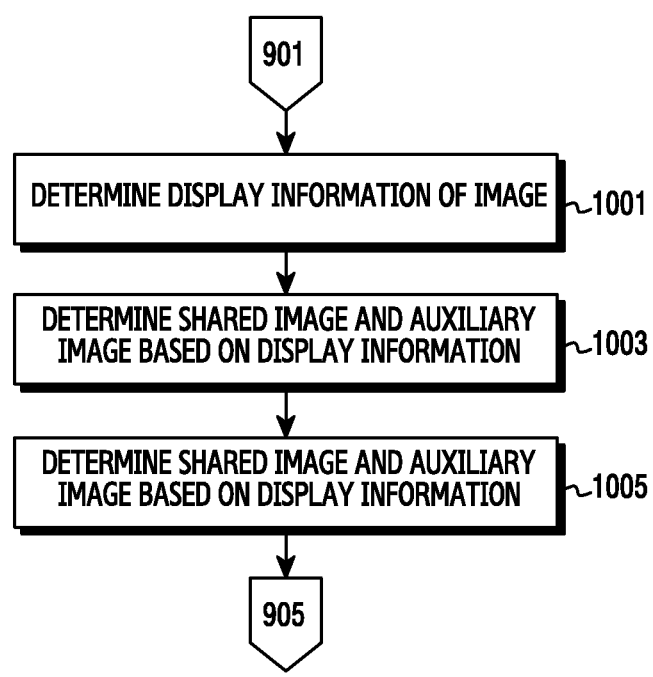
FIGS. 10A and 10B are flowcharts illustrating an operation for acquiring an auxiliary image in an electronic device according to various embodiments.
Figure 10B:
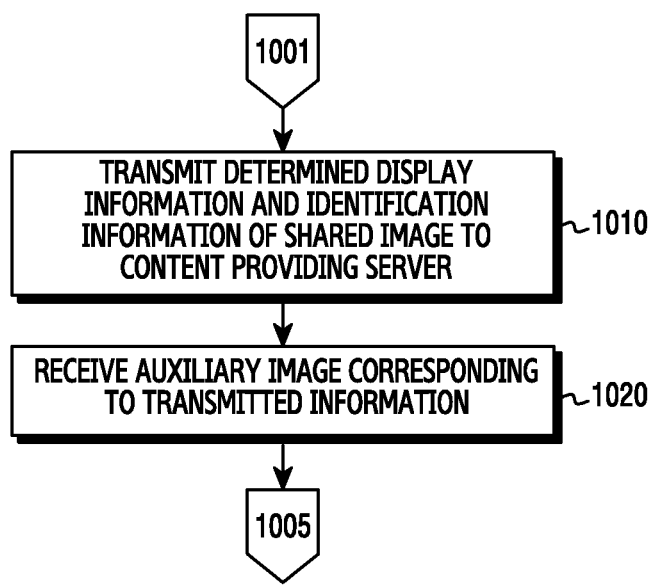

FIGS. 10A and 10B are flowcharts illustrating an operation for acquiring an auxiliary image in an electronic device according to various embodiments.

FIG. 10A is a flowchart illustrating an operation for generating a particular image in an electronic device according to various embodiments.

Referring to FIG. 10A, in operation 1001, the electronic device 101 (of FIG. 1) may determine the display information of the electronic device 101. According to an embodiment, when the electronic device 101 sets the background image of the display 150 (of FIG. 1) of the electronic device 101 based on the shared image, the electronic device 101 may determine the resolution of the display 150. When the electronic device 101 determines an icon image of a particular program based on the shared image, the electronic device 101 may determine the resolution of the icon. Alternatively, the user may select the desired resolution of the electronic device 101.

In operation 1003, the electronic device 101 may determine an auxiliary image of the shared image based on the determined display information. The electronic device 101 may include at least one auxiliary image of the shared image in the form of the same category or the same package. When determining the auxiliary image corresponding to a particular resolution based on the shared image, the electronic device 101 may use identification information of the shared image. According to an embodiment, when determining the particular resolution to be used based on the shared image, the electronic device 101 may identify the identification information of the shared image. The electronic device 101 may determine the auxiliary image corresponding to the particular resolution based on the identified identification information of the shared image. Alternatively, the electronic device 101 may determine the auxiliary image based on the display information of the display 150, the determined display information, or the identification information of the shared image.

In operation 1005, the electronic device 101 may generate the particular image based on the shared image and the auxiliary image. According to an embodiment, the electronic device 101 may enlarge the size of the shared image or increase the resolution of the shared image and merge the shared image with the auxiliary image, so as to generate the particular image. The electronic device 101 may determine positions of pixels included in the shared image in the particular resolution based on attribute information of the shared image in an operation for enlarging the shared image. The electronic device 101 may generate the particular image based on the enlarged shared image and the auxiliary image. When generating the particular image, the electronic device 101 may synthesize the shared image and the auxiliary image through a merging, modifying, or copying scheme.

The electronic device 101 may end the embodiment of FIG. 9 after performing operation 905.

FIG. 10B is a flowchart illustrating an operation for acquiring an auxiliary image in an electronic device according to various embodiments.

According to various embodiments, the embodiment of FIG. 10B corresponds to a flowchart illustrating an operation for acquiring an auxiliary image by making a request for transmitting an image of a particular resolution determined based on a shared image by the electronic device 101 or a request for transmitting an auxiliary image corresponding to the particular resolution to at least one other electronic device (e.g., the server 106) connected through network communication. Hereinafter, various embodiments of FIG. 10B may correspond to operations after operation 1001 of FIG. 10.

In operation 1010, the electronic device 101 may transmit the determined display information and the identification information of the shared image to the content-providing server (e.g., the server 106). Alternatively, the electronic device 101 may transmit the display information and the identification information of the shared image to another electronic device (e.g., the server 106) connected through network communication.

In operation 1020, the electronic device 101 may receive the auxiliary image from the content-providing server. According to an embodiment, the electronic device 101 may receive a particular image identical or similar to the shared image from the content-providing server, but may receive an auxiliary image that has a capacity smaller than that of the particular image or the shared image, thereby reducing the amount of transmitted/received data.

When operation 1020 is performed, the electronic device 101 may end the embodiment of FIG. 10B or may perform operation 1005 of FIG. 10A. The electronic device 101 may generate (or synthesize) the particular image based on the shared image and the received auxiliary image in operation 1005.

Figure 11:
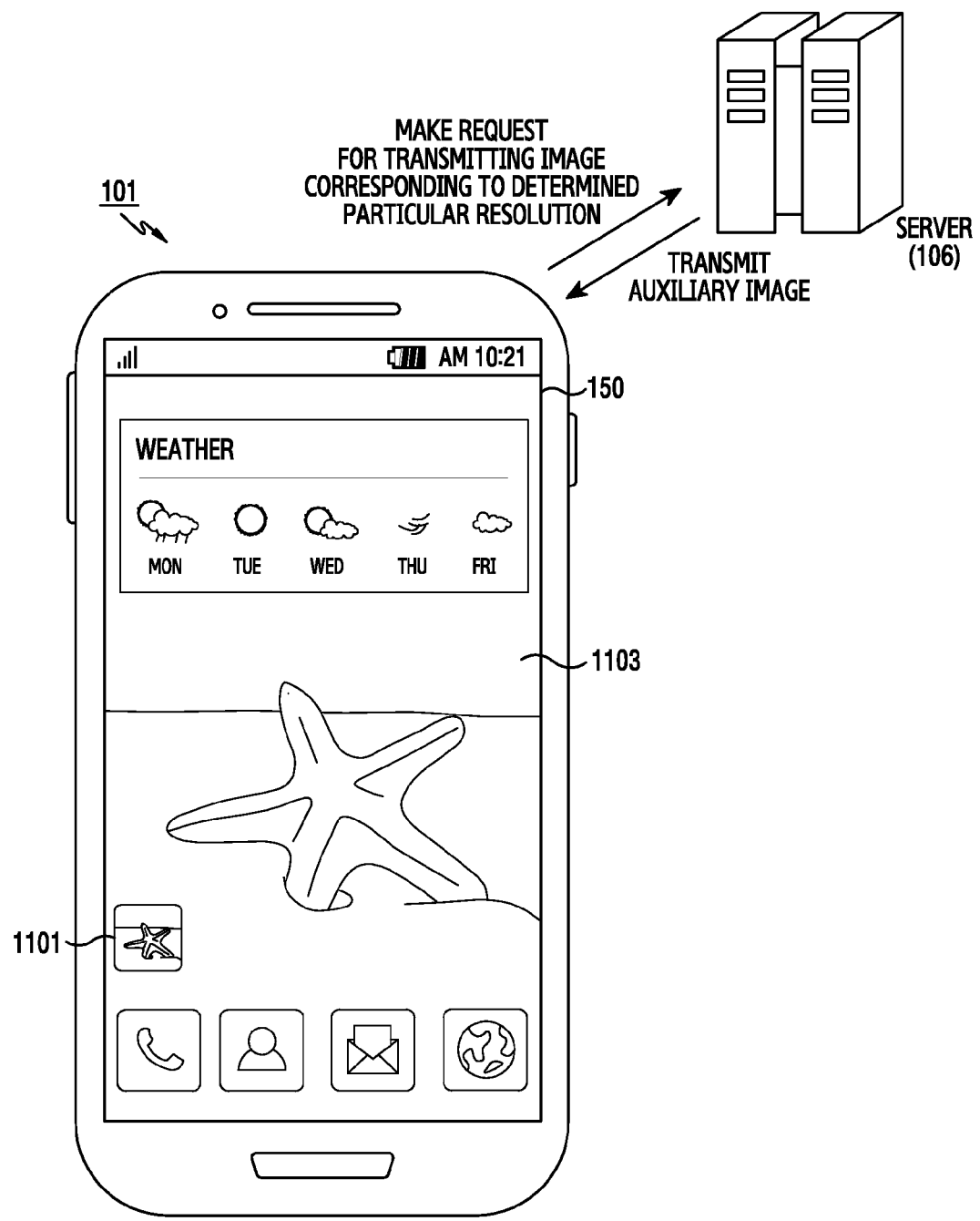
FIG. 11 illustrates an operation for acquiring a particular resolution image corresponding to a plurality of particular resolutions based on a shared image in an electronic device according to various embodiments.

FIG. 11 illustrates an operation for acquiring a particular resolution image corresponding to a plurality of particular resolutions based on a shared image in an electronic device according to various embodiments.

According to various embodiments, the electronic device 101 (of FIG. 1) may generate images of various resolutions based on the shared image. According to an embodiment, the electronic device 101 may require an image (e.g., a content image) indicating contents of various functions such as a graphic interface displayed on the display 150 and/or an image of a resolution optimized for each content. When determining each content image, the electronic device 101 may acquire an image of a corresponding resolution, but may generate an image corresponding to each resolution based on the shared image and the auxiliary image corresponding to one provided resolution. When acquiring the shared image, the electronic device 101 may acquire a plurality of shared images used for various contents as data in package form. The electronic device 101 may generate an image of a particular resolution corresponding to a content to be used, based on the acquired shared data.

According to an embodiment, when the electronic device 101 uses the shared image as an image of an execution icon 1101 (e.g., a short cut icon) of a particular program displayed on the display 150 (of FIG. 1), the electronic device 101 may identify a resolution of the shared image and a first particular resolution of the icon 1101. When the resolution of the shared image and the first particular resolution of the icon 1101 are different from each other, the electronic device 101 may determine whether there is an image of the first particular resolution of the shared image corresponding to the first particular resolution of the icon 1101. The electronic device 101 may identify a first auxiliary image corresponding to the first particular resolution of the icon 1101 based on the identification information of the shared image. When the first auxiliary image is not identified in the memory 130 (of FIG. 1), the electronic device 101 may make a request to the server 106 (of FIG. 1) for transmission of the first auxiliary image and the image of the first particular resolution. When transmitting the image transmission request information to the server 106, the electronic device 101 may also transmit the identification information of the shared image and information on the first particular resolution of the icon 1101. The electronic device 101 may receive the first auxiliary image corresponding to the first particular resolution of the icon 1101 from the server 106. The electronic device 101 may generate the image of the first particular resolution corresponding to the resolution of the icon 1101 based on the shared image and the first auxiliary image. The electronic device 101 may set the generated image of the first particular resolution as the image of the icon 1101.

As described above, although shared images used for respective contents are distinguished from each other, this is only for describing various embodiments, and it is apparent that one shared image may be used for various contents. According to an embodiment, the electronic device 101 may use the shared image as an image of another content 1103 (e.g., a background image). When the electronic device 101 uses the shared image as the background image 1103 (e.g., the background image of the display 150) of the particular program displayed on the display 150, the electronic device 101 may identify the resolution of the shared image and a second particular resolution of the display 150. When the resolution of the shared image and the second particular resolution of the display 150 are different from each other, the electronic device 101 may determine whether there is an image of the second particular resolution of the shared image corresponding to the second particular resolution of the display 150. The electronic device 101 may identify a second auxiliary image corresponding to the second particular resolution of the display 150 based on the identification information of the shared image. When the second auxiliary image is not identified in the memory 130, the electronic device 101 may make a request to the server 106 for transmission of the second auxiliary image or the image of the second particular resolution. When transmitting the image transmission request information to the server 106, the electronic device 101 may also transmit the identification information of the shared image and information on the second particular resolution of the display 150. The electronic device 101 may receive the second auxiliary image corresponding to the second particular resolution of the display 150 from the server 106. The electronic device 101 may generate the image of the second particular resolution corresponding to the resolution of the display 150 based on the shared image and the second auxiliary image. The electronic device 101 may set the generated image of the second particular resolution as the image of the display 150.

According to various embodiments, an operation method of an electronic device may include: acquiring a shared image from an image resource file; acquiring an auxiliary image generated based on a difference between the image resource file and the shared image; and generating a particular image resource file based on the shared image and the auxiliary image. According to an embodiment, the acquiring of the auxiliary image may include making a request to another electronic device for transmission of an image of a particular resolution and receiving the auxiliary image from the other electronic device. According to an embodiment, the auxiliary image may be an image determined based on particular resolution information and image identification information received by the other electronic device. According to an embodiment, the making of the request may include transmitting identification information of the shared image and resolution information corresponding to the image resource file. According to an embodiment, the shared image may correspond to a low resolution image including at least a part of the image resource file. According to an embodiment, the auxiliary image may include the remaining images except for the shared image in the particular resolution. According to an embodiment, the shared image may correspond to an image generated by at least one of the image resource file and a second image resource file of a resolution different from that of the image resource file. According to an embodiment, the operation method may further include: acquiring a second auxiliary image generated from a difference between the second image resource file and the shared image; and generating a second particular image resource file based on the shared image and the second auxiliary image.

Various embodiments performed by the electronic device 101 may be operations performed under control of the processor 120. The electronic device 101 may include a module, separate from the processor 120, which is programmed to control the various embodiments of the present disclosure. The separate module programmed to control the various embodiments of the present disclosure may operate under the control of the processor 120.

According to various embodiments, the processor 120 may acquire the shared image generated from the image resource file through the communication interface, acquire the auxiliary image generated based on a difference between the image resource file and the shared image, and generate a particular image resource file based on the shared image and the auxiliary image. According to an embodiment, the processor 120 may make a request to another electronic device for transmission of an image of a particular resolution and may receive an auxiliary image from the other electronic device. According to an embodiment, the processor 120 may determine the auxiliary image based on particular resolution information and image identification information received by the other electronic device. According to an embodiment, the processor 120 may transmit and make a request for resolution information corresponding to the identification information of the shared image and the image resource file. According to an embodiment, the processor 120 may process a low resolution image including at least a part of the image resource file to be the shared image. According to an embodiment, the processor 120 may process the auxiliary image including the remaining images except for the shared image in the particular resolution. According to an embodiment, the processor 120 may generate the shared image from at least one of the image resource file and a second image resource file of a resolution different from that of the image resource file. According to an embodiment, the processor 120 may acquire a second auxiliary image generated from a difference between the second image resource file and the shared image and generate a second particular image resource file based on the shared image and the second auxiliary image.

According to various embodiments, the server can reduce management costs by configuring one image file, which can be applied to all of a plurality of electronic devices having various resolutions.

According to various embodiments, it is possible to reduce the size of an image file by reducing unnecessary resources.

According to various embodiments, it is possible to provide a high quality image file which has no image quality deterioration even though the size of the image file is reduced.

According to various embodiments, an electronic device may include a computer-readable storage medium recording a program for executing a process. The process may include: acquiring a shared image from an image resource file; acquiring an auxiliary image generated based on a difference between the image resource file and the shared image; and generating a particular image resource file based on the shared image and the auxiliary image.

The term "module" as used in the present disclosure, for example, may mean a unit including one of hardware, software, and firmware or any combination of two or more of them. The "module", for example, may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing certain operations, which are now known or will be developed in the future.

The method according to the disclosure as described above may be implemented as a program command which can be executed through various computers and recorded in a computer-readable recording medium. The recording medium may include a program command, a data file, and a data structure. Further, the program command may be specially designed and configured for the present disclosure or may be used after being known to those skilled in computer software fields. The recording medium may include magnetic media such as a hard disk, a floppy disk and a magnetic tape, optical media such as a Compact Disc Read-Only Memory (CD-ROM) and a DVD, magneto-optical media such as a floptical disk, and hardware such as a Read-Only Memory (ROM), a Random Access Memory (RAM) and a flash memory. Further, the program command may include a machine language code generated by a compiler and a high-level language code executable by a computer through an interpreter and the like.

While the present disclosure has been shown and described with reference to various embodiments therefore, it will be understood by those skilled in the art that various changes in form and details may be made therein without departing from the spirit and scope of the present disclosure as defined by the appended claims and their equivalents.

What is claimed is:
1. An electronic device comprising:
 a communication interface configured to receive an image resource file from a content-providing server;
 a processor configured to generate a shared image from the image resource file, identify display information of the electronic device, determine an auxiliary image using a difference between the display information and the shared image, and generate a particular image based on the shared image and the auxiliary image; and
 a display configured to display the generated particular image.
2. The electronic device of claim 1, wherein the processor generates the auxiliary image using a difference between the shared image and the image resource file, or requests for the auxiliary image to the content-providing server and to receive the auxiliary image from the content-providing server.

3. The electronic device of claim 2, wherein the processor transmits the display information and identification information of the shared image to the content-providing server and receives an auxiliary image corresponding to the display information and the identification information.

4. The electronic device of claim 1, wherein the display information corresponds to at least one of a) a resolution of the electronic device and b) a resolution selected by a user.

5. The electronic device of claim 1, wherein the shared image is a low resolution image of the image resource file.

6. The electronic device of claim 1, wherein the processor processes the remaining images after subtracting image information of the shared image from the image resource file as the auxiliary image.

7. The electronic device of claim 1, wherein the processor acquires the shared image from at least one of the image resource file and a second image resource file of a resolution different from that of the image resource file.

8. The electronic device of claim 7, wherein the processor generates a second auxiliary image using a difference between the second image resource file and the shared image, and generates a second particular image based on the shared image and the second auxiliary image.

9. An operation method of an electronic device, the operation method comprising:
    acquiring a shared image from an image resource file;
    identifying display information of the electronic device;
    determining an auxiliary image using a difference between the display information and the shared image; and
    generating a particular image based on the shared image and the auxiliary image.

10. The operation method of claim 9, wherein the acquiring of the auxiliary image comprises at least one of:
    generating the auxiliary image using a difference between the shared image and the image resource file; and
    requesting for the auxiliary image to a content-providing server and receiving the auxiliary image from the content-providing server.

11. The operation method of claim 10, wherein the receiving of the auxiliary image comprises:
    transmitting the display information and identification information of the shared image to the content-providing server; and
    receiving an auxiliary image corresponding to the display information and the identification information.

12. The operation method of claim 10, wherein the display information corresponds to at least one of a) a resolution of an electronic device and b) a resolution selected by a user.

13. The operation method of claim 9, wherein the shared image is a low resolution image of the image resource file.

14. The operation method of claim 9, wherein the auxiliary image includes the remaining images after subtracting image information of the shared image from the image resource file.

15. The operation method of claim 9, wherein the shared image corresponds to an image generates by at least one and a second image resource file of a resolution different from that of the image resource file.

16. The operation method of claim 15, further comprising:
    generating a second auxiliary image using a difference between the second image resource file and the shared image; and
    generating a second particular image based on the shared image and the second auxiliary image.

17. A computer-readable storage medium recording a program for executing a process, the process comprising:
    acquiring a shared image from an image resource file;
    identifying display information of an electronic device;
    determining an auxiliary image based on a difference between the display information and the shared image; and
    generating a particular image based on the shared image and the auxiliary image.

18. The computer-readable storage medium recording a program of claim 17, wherein the acquiring of the auxiliary image comprises at least one of:
    generating the auxiliary image using a difference between the shared image and the image resource file; and
    requesting for the auxiliary image to a content-providing server and receiving the auxiliary image from the content-providing server.

19. The computer-readable storage medium recording a program of claim 18, wherein the receiving of the auxiliary image comprises:
    transmitting the display information and identification information of the shared image to the content-providing server; and
    receiving an auxiliary image corresponding to the display information and the identification information.

20. The computer-readable storage medium recording a program of claim 18, wherein the display information corresponds to at least one of a) a resolution of an electronic device and b) a resolution selected by a user.

* * * * *